United States Patent [19]

Kibune et al.

[11] Patent Number: 5,140,572
[45] Date of Patent: Aug. 18, 1992

[54] OPTICAL PICKUP DEVICE HAVING FIXED AND MOVABLE OPTICAL SYSTEMS

[75] Inventors: Hideaki Kibune, Kawasaki; Takehide Ohno, Yokohama, both of Japan

[73] Assignee: Ricoh Company, Ltd., Tokyo, Japan

[21] Appl. No.: 480,818

[22] Filed: Feb. 16, 1990

[30] Foreign Application Priority Data

Feb. 22, 1989 [JP] Japan ................................ 1-42552
Jun. 20, 1989 [JP] Japan ................................ 1-157969
Jan. 31, 1990 [JP] Japan ................................ 2-21783

[51] Int. Cl.$^5$ ............................................. G11B 7/00
[52] U.S. Cl. ............................... 369/44.14; 369/44.17; 250/201.5
[58] Field of Search ............ 369/32, 33, 44.14, 44.15, 369/44.16, 44.17, 44.19, 112, 119, 111; 250/201.5

[56] References Cited

U.S. PATENT DOCUMENTS

| | | | |
|---|---|---|---|
| 4,507,766 | 3/1985 | Saimi et al. | 369/44.14 |
| 4,688,201 | 8/1987 | Towner et al. | 369/119 X |
| 4,959,824 | 9/1990 | Ueda et al. | 369/112 X |
| 4,977,552 | 12/1990 | Gotoh | 369/44.14 |

Primary Examiner—Robert L. Richardson
Attorney, Agent, or Firm—Cooper & Dunham

[57] ABSTRACT

A separation type optical pickup device which comprises a fixed optical system and a movable optical system which is separated from the fixed system. The fixed optical system is unmovable with respect to an optical information recording medium. The fixed system includes an optical beam emission system and a deflection member which deflects a beam emitted from the emission system. The deflection member is disposed on an optical axis of the beam and rotatable about a rotary axis which is parallel to the optical axis of the beam. The movable optical system is movable with respect to the information recording medium and guides the beam transmitted from the fixed optical system to the recording medium.

7 Claims, 7 Drawing Sheets

OPTICAL PICKUP DEVICE HAVING FIXED AND MOVABLE OPTICAL SYSTEMS

BACKGROUND OF THE INVENTION

1. Field of the Invention

The present invention relates to a split type optical pickup device comprising a fixed optical system and a movable optical system.

The present invention also relates to a split type optical pickup device which writes information on an optical information recording medium and reads information therefrom and which device has a focus servo system and a track servo system which are operated by using reflection rays reflected from the optical information recording medium.

2. Description of the Related Art

An optical pickup device is used for writing information on an optical disk and reading information from the disk. Such an optical pickup device comprises tracking means for conducting a tracking function, that is, for positioning an optical spot on a desired track on the disk. The tracking means comprises a semiconductor laser source, a tracking mirror and an optical focussing head. The semiconductor laser beam emitted from the laser source is deflected by the tracking mirror so that the optical path thereof is adjusted. The deflected beam passes through the focussing head which focuses the beam on the disk at a desired position.

Japanese Patent Application Laying Open (KOKAI) No. 56-187869 discloses an optical pickup device which comprises a two-step positioning system composed of a first rough positioning system and a second accurate positioning system which utilizes the above-mentioned tracking means. The two-step positioning system aims to achieve a high speed access motion.

However, the positioning function is often disturbed when the two positioning systems mechanically interfere with each other. Also, there is another problem that due to weight imbalance about the rotary tracking mirror axis, a rotary moment about the axis is generated in response to the motion of the rough positioning system, which causes an error of the positioning operation of the tracking mirror.

In order to obviate the above-mentioned problems, Japanese Patent Application Laying Open (KOKAI) No. 60-163235 discloses an optical structure wherein the rotary axis of the tracking mirror is disposed in parallel to the direction of the movement of the rough positioning system and wherein an optical system is arranged between the tracking mirror and the focussing system so that the deflection direction of the tracking mirror is turned by 90 degrees.

In accordance with the structure mentioned above, it becomes possible to remove the mechanical interference between the moving pickup and the rotating tracking mirror and avoid the influence due to the weight imbalance of the tracking mirror, which makes it possible to realize a stable control of the spot position as well as shorten the access time by minimizing the vibration of the tracking mirror due to the movement of the pickup at the time of track access operation.

However, the device disclosed in the publication is arranged so that the entire pickup moves in the radial direction of the optical disk and the weight of the movable portion is heavy, which impedes high speed access motion of the pickup. Also, the device requires that the optical system rotates the deflection direction by 90 degrees, which further increases the weight of the pickup and makes it difficult to fully delete the mechanical interference mentioned above and sufficiently shorten the access time of the pickup.

A pickup device is proposed to obviate the drawbacks of the above-mentioned device by adopting an arrangement wherein the tracking mirror is fixed to avoid mechanical interference due to the motion thereof as well as to reduce the weight of the movable portion to achieve a pick up with high speed access motion.

The proposed device comprises a movable optical system and a fixed optical system. The fixed optical system comprises a semiconductor laser source which emits a laser beam and a beam output system comprising a coupling lens, a polarization beam splitter, a quarter-wave plate and a defection prism. The laser beam emitted from the source propagates through the coupling lens, the polarization beam splitter and the quarter-wave plate. The beam is then deflected by the prism toward the tracking mirror which further deflects the beam toward the movable optical system.

The movable optical system reciprocatedly moves in the radial direction of the optical disk. The disk is mounted on a turn table which is fixed on a rotary shaft. The movable optical system comprises a carriage base which is mounted on a guide rail and reciprocatedly movable along the guide rail in the radial direction of the disk. Also, a deflection prism and an objective lens are mounted on the carriage base. The laser beam output from the fixed optical system enters into the movable optical system wherein the beam is deflected by the deflection prism and after that converged by the objective lens so that the beam forms a minute spot on the optical information recording midium of the disk. The focal point of the objective lens is controlled by a focus actuator. The laser beam is reflected by the disk and propagates back to the fixed optical system through the objective lens and the deflection prism. The reflection beam passes through the tracking mirror, the deflection prism, and the quarter-wave plate in the fixed optical system. After that, the reflection beam is deflected by the polarization beam splitter and propagates through a condenser lens and a cylindrical lens to a four-division element which detects a predetermined information signal from the reflection beam as well as outputs a focus error signal and a track error signal. The focus actuator is driven in response to the focus error signal so that the objective lens is shifted along the optical path of the beam. Also, the tracking mirror is rotated in response to the track error signal to adjust the position of the pickup with respect to the track.

However, in accordance with the proposed structure mentioned above, the deflection prism has to be disposed above or below the tracking mirror so that the optical path is deflected and perpendicularly folded, which makes it difficult to realize a compact and thin optical pickup device.

Another optical pickup device relating to the present invention is described hereinafter.

The device comprises an optical pickup body in which semiconductor laser source, a plurality of mirrors, a galvano mirror, and an objective lens are arranged. A laser beam emitted from the source is converged by the objective lens on the optical disk to form a spot thereon.

A tracking servo method for adjusting the position of the optical spot on the disk is such that, first, the pickup body is roughly positioned at a position corresponding to a desired track of the disk by moving the pickup body in the seeking direction with the use of rollers which are attached to the pickup body, and after that, the galvano mirror which has a rotary axis arranged in the seeking direction is rotated to accurately adjust the position of the track of the disk.

By the arrangement in which the rotary axis of the galvano mirror is disposed in parallel with the seeking direction, it becomes possible to delete mechanical interference between the rough positioning system and the accurate positioning system so that a stable optical spot is irradiated on the disk.

However, the pickup body of the above-mentioned device is heavy so that the body cannot move at a high speed to seek the track, which shortens the access time of the pickup.

To cope with the above-mentioned drawbacks, an optical disk drive is proposed by the applicant of this application in the prior Japanese Patent Application No. 63-227842 which is not published yet.

The proposed disk drive comprises a fixed optical system in which a laser beam emitted from a semiconductor laser source is collimated by a coupling lens and passes through a polarization beam splitter and a quarter-wave plate. After that, a deflection prism deflects the laser beam toward a tracking mirror which reflects the laser beam out of the fixed optical system.

The laser beam output from the fixed optical system is introduced into a movable optical system. The movable optical system comprises a carriage base which is mounted on a rail through rollers which rail is disposed along the seeking direction. A deflection prism is mounted on the carriage base. The beam reflected by the prism is converged by an objective lens on a surface of an optical disk to write information on the disk or read information from the disk.

On the other hand, rays reflected from the disk propagate back through the movable system to the fixed system. In the fixed system, the reflection beam is reflected by the polarization beam splitter toward a signal detection portion which includes a condenser lens for converging the beam, a cylindrical lens for generating astigmatism in the beam and a four-division element which detects a focus error signal and a track error signal as well as reads information from the disk.

When the focal point on the disk is to be adjusted, a focus actuator arranged in the movable system is driven in response to the focus error signal. Whereas when the tracking position is to be adjusted, the tracking mirror arranged in the fixed system is driven in response to the track error signal. Since the tracking servo system including the tracking mirror for adjusting the tracking position is disposed within the fixed system, the weight of the movable system is reduced, which makes it possible to shorten the access time of pickup and delete mechanical interference which is generated due to the movement of the movable system and impairs the function and effect of the fixed system.

However, in accordance with the above-mentioned separation type pickup device wherein the movable system is separated from the fixed system, the optical path between the deflection prism and the tracking mirror and to the disk surface, is, perpendicular to the optical path between the fixed system and the movable system. Therefore, a relatively large space is required in the direction perpendicular to the disk surface, which means the device becomes tall and large.

SUMMARY OF THE INVENTION

It is therefore an object of the present invention to provide a separation type optical pickup device in which the optical path of the fixed system is arranged in a same plane thereby realizing a thin and compact structure.

The object of the invention can be achieved by an optical pickup device comprising a fixed optical system having an optical beam emitting system and a movable optical system which guides the optical beam output from the fixed system onto an optical disk, wherein the fixed system comprises a deflection member for deflecting the beam emitted from the emitting system toward the movable system, and wherein the deflection member is rotatable about an axis which is arranged in parallel with the optical path of the beam to perform a tracking motion.

Also, in accordance with a desirable structure, the deflection member of the pickup device of the invention is supported by at least a pair of leaf springs in such a way that the member can be rotated about a predetermined rotary axis which is aligned with the optical path of the beam from the emitting system.

In accordance with the device mentioned above, the device is arranged in such a way that the optical beam emitted from the beam emitting system of the fixed system is deflected by the deflection member and after that directly introduced into the movable system and that the tracking position is controlled by rotating the deflection member about an axis which is in parallel with the optical path of the beam. Therefore, it becomes unnecessary to arrange an optical path between the deflection member of the fixed system and the movable system in addition to the optical path of the beam in the fixed system so that the optical axes of the fixed system are arranged in the same plane.

Also, in accordance with the desired structure mentioned above, the rotary motion of the deflection member in the tracking operation is conducted in a state wherein the axis of rotation of the deflection member is kept aligned with the optical axis of the beam output from the fixed system, which makes it possible to reduce the size of the deflection member and the space required for rotary motion of the member.

The object of the invention mentioned before can also be achieved by an optical pickup device which comprises a fixed optical system including a semiconductor laser source and a polarization beam splitter through which a laser beam from the laser source passes and propagates out of the fixed system wherein a first deflection member is disposed on an optical path of the laser beam which member is rotatable about an axis which is perpendicular to the surface of the optical information recording medium, and wherein a second deflection member is disposed in the movable system on an optical path of the beam deflected by the first deflection member and guided to the movable system before an deflection prism which is also disposed in the movable system so that the beam is deflected by 90 degrees in a plane which is in parallel with the optical information recording medium.

In accordance with the optical pickup device structure mentioned above, the optical path of the beam between the laser source and the first member is arranged on the same plane as the optical path of the beam between the first member and the movable system, the plane being in parallel with the information recording medium surface, which makes it possible to reduce the height of the pickup device in the direction perpendicular to the recording medium surface.

An advantage of the above-mentioned structure is that it becomes possible to realize a thin and compact optical pickup device since all of the optical axes in the fixed system can be arranged in a plane of the same level due to the featured structure wherein a deflection member is provided to deflect the laser beam from the laser source of the fixed system toward the movable system so that it becomes unnecessary to arrange an optical path in addition to that of the laser emitting system of the fixed system in the vertical space between the optical path of the fixed system and that of the movable system and wherein the tracking position is controlled by rotating the deflection member about an axis which is arranged in parallel with the optical axis of the beam guided from the fixed system.

Another advantage of the above-mentioned structure is that it becomes possible to reduce the number of parts for constituting the device and realize a small and light-weighted device since it become unnecessary to arrange an optical path in addition to that of the beam emitting system of the fixed system.

An advantage of the above-mentioned desirable structure of the invention in addition to those mentioned above is that the device becomes further compact, thinner and lighter since it becomes possible to reduce the light-receiving area required for the deflection member and the space for rotary motion of the member due to the arrangement wherein the member is rotated about an axis which is aligned with the optical axis the beam introduced from the beam emitting system so that the rotary motion of the deflection member is always performed in a state wherein the rotary axis thereof coincides with the optical axis of the beam emitting system of the fixed system in the track servo control operation.

An advantage of the above-mentioned structure of the invention is that the whole structure of the device becomes still further compact due to the arrangement wherein a first deflection member is disposed on an optical path of the beam in the fixed system in such a way that the member is rotatable about an axis which is perpendicular to the surface of the optical information recording medium and wherein a second deflection member is disposed on an optical path of the beam between the first member and the deflection prism disposed in the movable system in such a way that the beam is deflected by 90 degrees in a plane which is in parallel with the surface of the information recording medium so that the tracking servo operation can be conducted by rotating the first member in a plane which is in parallel with the recording medium surface, which makes it possible to dispose all of the optical parts of the fixed system substantially in the same plane, which reduces the height of the device in the direction perpendicular to the recording medium surface.

Further objects and advantages of the present invention will be apparent from the following description of the preferred embodiments of the invention as illustrated in the accompanying drawings.

BRIEF DESCRIPTION OF THE DRAWINGS

FIG. 2b is an explanatory bottom view of the structure of FIG. 2a;

FIG. 5b is an explanatory bottom view of the deflection member of FIG. 5a;

DESCRIPTION OF THE PREFERRED EMBODIMENTS

Embodiments of the present invention are described hereinafter with reference to the drawings in comparison to the structure of the related art prior to provision of the improvements of the invention.

Figure 6:
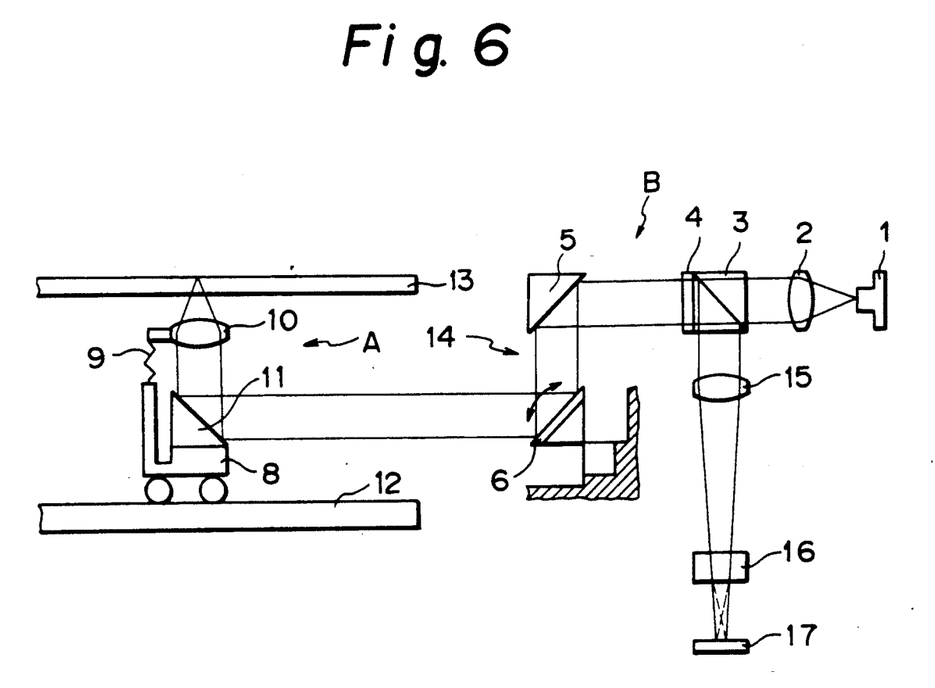
FIG. 6 is a constructional view of an optical pickup device relating to the structure of the present invention.

An optical pickup device relating to the present invention comprises a movable optical system A and a fixed optical system B. The fixed optical system B comprises a semiconductor laser source 1 which emits a laser beam and a beam output system comprising a coupling lens 2, a polarization beam splitter 3, a quarter-wave plate 4 and a deflection prism 5. The laser beam emitted from the source 1 propagates through the coupling lens 2, the polarization beam splitter 3 and the quarter-wave plate 4. The beam is then deflected by the prism 5 toward the tracking mirror 6 which further deflects the beam toward the movable optical system A.

The movable optical system A reciprocatedly moves in the radial direction of the optical disk 13. The disk 13 is mounted on a turn table which is fixed on a rotary shaft (not shown). The movable optical system A comprises a carriage base 8 which is mounted on a guide rail 12 and reciprocatedly movable along the guide rail 12 in the radial direction of the disk 13. Also, a deflection prism 11 and an objective lens 10 are mounted on the carriage base 8. The laser beam output from the fixed optical system B enters into the movable optical system A wherein the beam is deflected by the deflection prism 11 and after that converged by the objective lens 11 so that the beam forms a minute spot on the optical information recording medium of the disk 13. The focal point of the objective lens 10 is controlled by a focus actuator 9. The laser beam is reflected by the disk 13 and propagates back to the fixed optical system B through the objective lens 10 and the deflection prism 11. The reflection beam passes through the tracking mirror 6, the deflectoin prism 5 and the quarter-wave plate 4 in a fixed optical system B. After that, the reflection beam is deflected by the polarization beam splitter 3 and propagates through a condensor lens 15 and a cylindrical lens 16 to a four-division element 17 which detects a predetermined information signal from the reflection beam as well as a focus error signal and a track error signal. The focus actuator 9 is driven in response to the focus error signal so that the objective lens 10 is shifted along the optical path of the beam. Also, the tracking mirror 6 is rotated in response to the track error signal to adjust the position of the pickup with respect to the track.

However, in accordance with the related art structure mentioned above, the deflection prism 5 has to be disposed above or below the tracking mirror 6 so that the optical path is deflected to perpendicularly turn, which make it difficult to realize a compact and thin optical pickup device.

The above-mentioned drawbacks can be obviated by an embodiment of the present invention described below.

Figure 1:
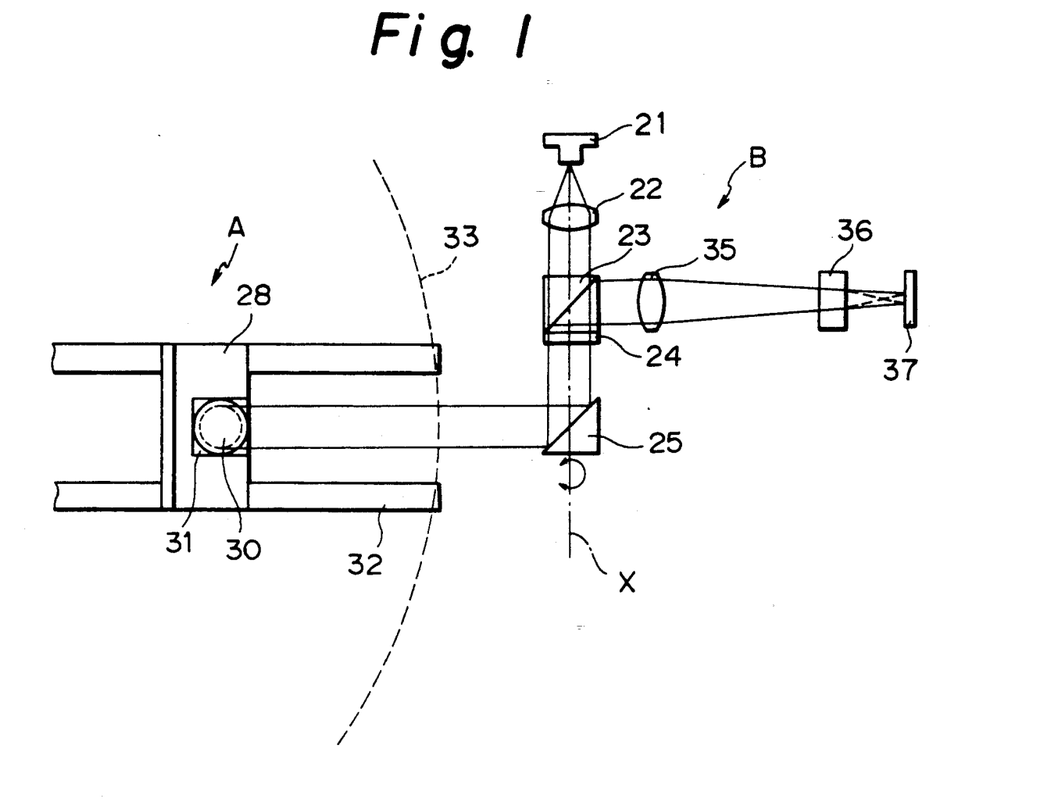
FIG. 1 is a constructional plan view of an embodiment of an optical pickup device in accordance with the present invention.

As illustrated in FIG. 1, a movable optical system A and a fixed optical system B are mounted on a base frame (not shown). A laser beam is emitted from a semiconductor laser source 21 which is disposed in the fixed system B. The beam propagates through a beam emission system which comprises a coupling lens 22, a polarization beam splitter 23, and a quarter-wave plate 24 and impinges upon deflection prism 25. The deflection prism 25 deflects the beam toward the movable system A. Therefore, the optical axes of the beam in the beam emission system of the system B and the beam from system B to prism 25 are arranged to form one aligned line.

The movable system A is reciprocable in the radial direction of an optical disk 33 represented by a dash line. The disk 33 is placed on a turn table (not shown) which is fixed to a rotary shaft (not shown). In the system A, a carriage base 28 is mounted on a pair of parallel guide rails 32 in such a way that the carriage 28 is reciprocable in the radial direction of the disk 33. A deflection prism 30 and an objective lens 30 are mounted on the carriage 28. The beam output from the fixed system B is deflected by the prism 30 and converged by the lens 30 on the disk 33 to form a minute optical spot thereon. The focal point of the lens 30 is controlled by a focus actuator (not shown).

The beam impinging upon the disk 33 is reflected thereby. Some of the reflection rays reflected from the disk 33 propagates back to the fixed system B through the lens 30 and the prism 31.

In the fixed system B, the reflection beam passes through the prism 25 and the plate 24 and impinges upon the splitter 23 which deflects the beam to the right of FIG. 1. The deflected beam passes through a condenser lens 35 and a cylindrical lens 36 and impinges upon a four-division element 37. The element 37 detects an information signal from the beam as well as a focus error signal and a track error signal. The focus actuator is driven in response to the focus error signal to shift the lens 30 along the optical axis thereof. Also, the prism 25 is driven by a driver means in response to the track error signal to rotate about the optical axis (X) of the beam emitted from the laser source 21.

Figure 2A:
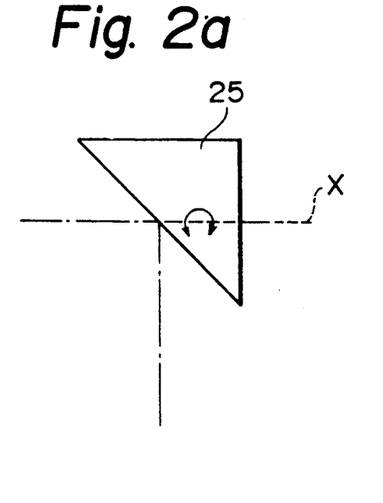
FIG. 2a is an explanatory plan view of a structure for supporting the deflection member of the present invention.
Figure 2B:
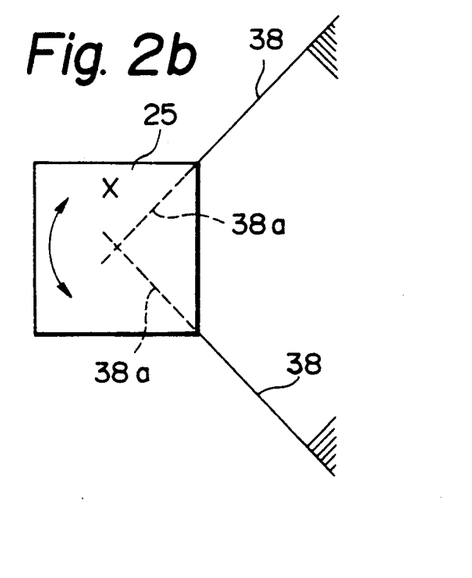

FIGS. 2a and 2b illustrate a support means for supporting the above-mentioned prism 25. The prism 25 is mounted to the device body side through a pair of leaf springs 38. Each spring 38 is secured to the body at an end thereof in such a way that each spring extends perpendicular to the axis X of the laser beam emitted from the source 21 and that each spring is deformable about the securing end thereof in a plane perpendicular to the axis X. By this arrangement, the prism 25 becomes rotatable about the axis X within a rotational angle range which is necessary to adjust the tracking position of the beam. The extension lines 38a of the springs 38 intersect each other on the axis X about which the prism 25 is rotated.

The track control function of the prism 25 mentioned above is described hereinafter with reference to FIGS. 3a to 3c.

Figure 3A:
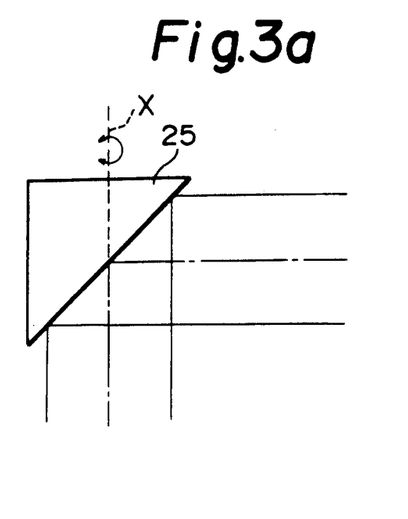
FIGS. 3a, 3b and 3c are enlarged explanatory views for explaining the tracking function of the deflection member of the present invention.

First, referring to FIG. 3a, the laser source 21 (FIG. 1) is located in the under side of the prism 25 in the drawing. Also, the movable system A is arranged in the right side of the drawing. Also, FIGS. 3b and 3c are views seen from the laser source 21 side.

Figure 3B:
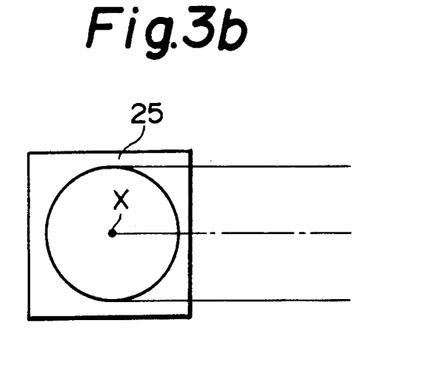
Figure 3C:
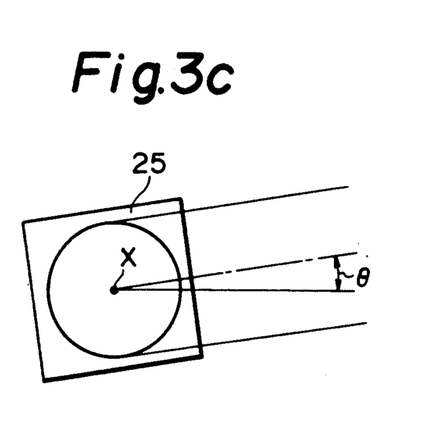

When the tracking position is to be adjusted, the prism 25 is rotated by an angle $\theta$ about the axis X, as illustrated in FIG. 3c. By this operation, the beam output from the fixed system B is diverged by the angle $\theta$ in the tracking direction so that the tracking point is adjusted on the disk.

Figure 4A:
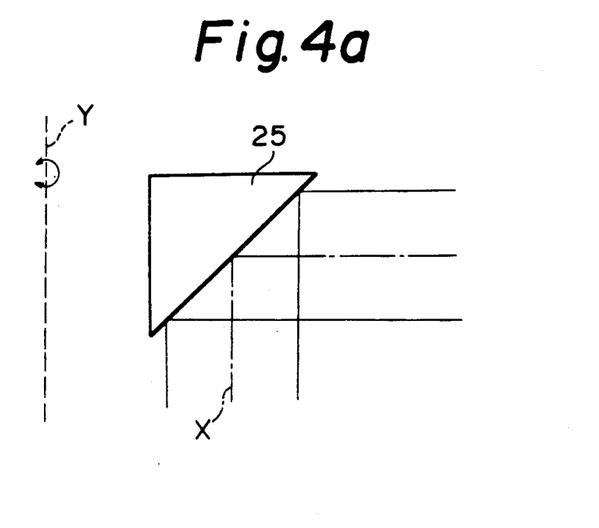
FIGS. 4a, 4b and 4c are further enlarged explanatory views for explaining the tracking function of the deflection member of the present invention.
Figure 4B:
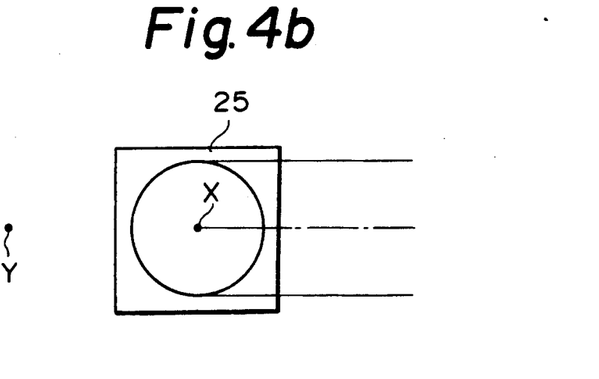
Figure 4C:
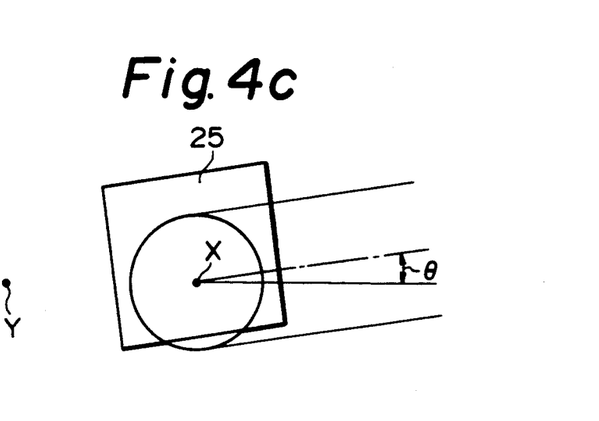

Another rotational arrangement of the prism 25 is illustrated in FIGS. 4a to 4c, in comparison to the arrangement of FIGS. 3a to 3c.

In this arrangement, the rotary axis Y of the prism 25 does not coincide with the axis X of the laser beam. The axis Y is parallel with the axis X. FIGS. 4a to 4c correspond to FIGS. 3a to 3c, respectively. When the prism 25 is rotated by an angle $\theta$ about the axis Y to adjust the tracking point of the laser beam, the beam output from the fixed system B is diverged by the angle $\theta$ in the tracking direction, as in the arrangement of FIGS. 3a to 3c mentioned above. However, in the arrangement of FIGS. 4a to 4c, the beam is dislocated from the center of the prism 25 when the prism 25 is rotated, as can be seen from FIG. 4c. Therefore, a large area for reflecting the beam is required to avoid misimpinging of the beam to the prism 25. Besides, a larger space is required for moving the prism 25 to diverge the beam by the same angle $\theta$ than in the arrangement of FIGS. 3a to 3c. Therefore, it is desirable to position prism 25 so that the axes X and Y coincide with each other.

The prism 25 may be held by a holder which is supported by the springs 38 instead of being directly supported by the springs 38 as mentioned above. Also, a plurality of pairs of springs may be provided to support the prism 25. Further, the angle of each spring 38 with respect to the device body is not limited to that of FIG. 2b.

Figure 5A:
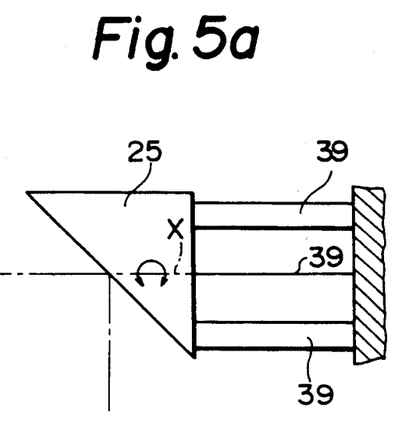
FIG. 5a is an explanatory plan view of the deflection member in accordance with another embodiment of the present invention.
Figure 5B:
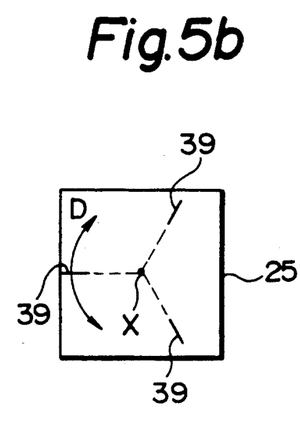

FIGS. 5a and 5b illustrate another example of the support means for supporting the prism 25 in a state wherein the rotary axis of the prism 25 coincides with the optical axis X of the beam. In this example, the prism 25 is supported by three leaf springs 39 each of which is secured to the device body side at an end thereof. Each spring 39 extends in the direction parallel to the axis X of the beam output from the laser source 21. Also, the springs 39 are disposed the same distance from the axis X, i.e., on a circle having a center which coincides with the axis X. The springs 39 are deformable along the circle as shown by an arrow D in FIG. 5b. Also, the extensions of the three springs 39 in the lateral direction thereof intersect with each other on the axis X, as illustrated in FIG. 5b, whereby the rotary axis of the prism 25 becomes coincident with the axis X so that the prism 25 can be rotated about the axis X to adjust the tracking point of the beam. The function and effect of the arrangement of FIGS. 5a and 5b are substantially the same as those of FIGS. 3a and 3c.

The prism 25 may be held by a holder which is supported by the springs 39 instead of being directly supported by the springs 39 as illustrated in FIGS. 5a and 5b. Also, the number of the springs 39 and the inclination angle thereof are not limited to those illustrated in FIGS. 5a and 5b.

Also, a deflection mirror plate may be disposed as the defleciton means which has a axis of rotation arranged in parallel with the axis X of the beam output from the laser source 21, instead of the prism 25 mentioned above without impairing the function and effect of the invention.

Figure 10:
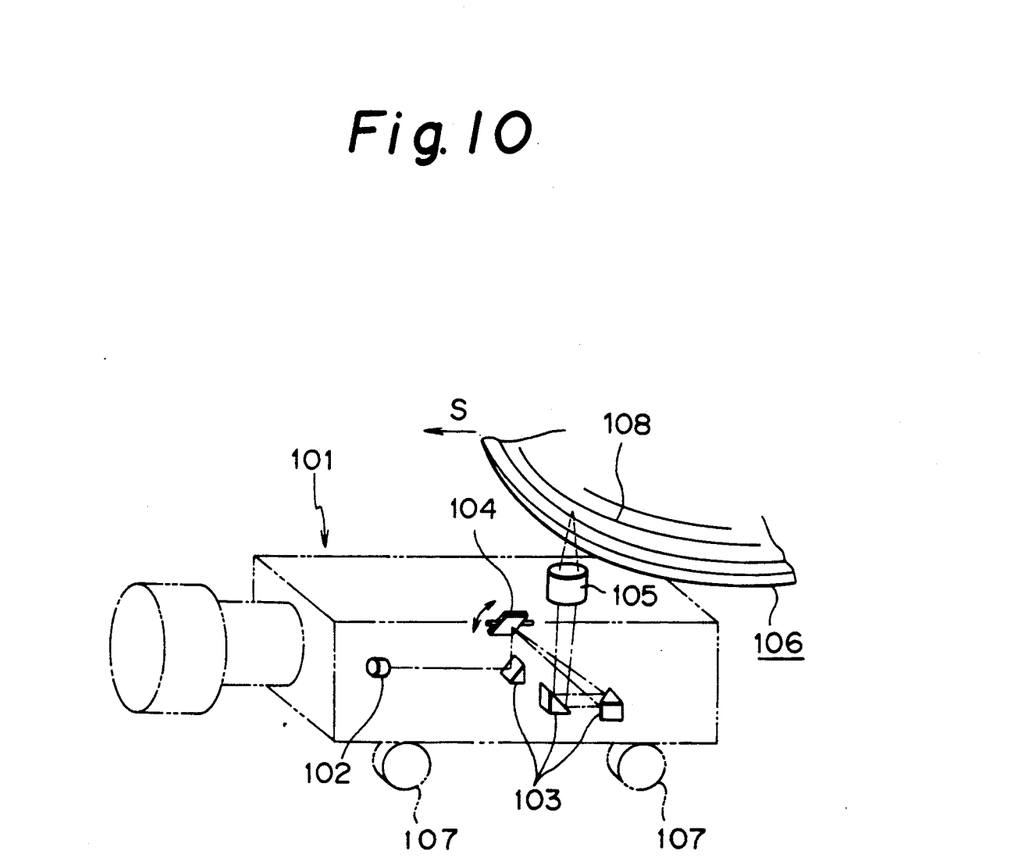
FIG. 10 is a constructional view of another example of the optical pickup device relating to the present invention.

Another optical pickup device relating to the present invention is described hereinafter with reference to FIG. 10.

The device comprises an optical pickup body 101 in which a semiconductor laser source 102, a plurality of mirrors 103, a galvano mirror 104, and an objective lens 105 are arranged. A laser beam emitted from the source 102 is converged by the objective lens 105 on the optical disk 106 to form a spot thereon.

A tracking servo method for adjusting the position of the optical spot on the disk 106 is such that, first, the pickup body 101 is roughly positioned at a position corresponding to a desired track 108 of the disk 106 by moving the pickup body 101 in the seeking direction S with the use of rollers 107 which are attached to the pickup body 101, and after that, the galvano mirror 104 which has a rotary axis arranged in the seeking direction S is rotated to accurately adjust the position of the track 108 of the disk 106.

By the arrangement in which the rotary axis of the galvano mirror 104 is disposed in parallel with the seeking direction S, it becomes possible to delete the mechanical interference between the rough positioning system and the accurate positioning system so that a stable optical spot is always irradiated onto disk 106.

However, the pickup body 101 of the above-mentioned device is heavy so that the body 101 cannot move at a high speed to seek the track 108, which shortens the access time of the pickup.

To cope with the above-mentioned drawbacks, an optical disk drive is proposed by the applicant.

Figure 11:
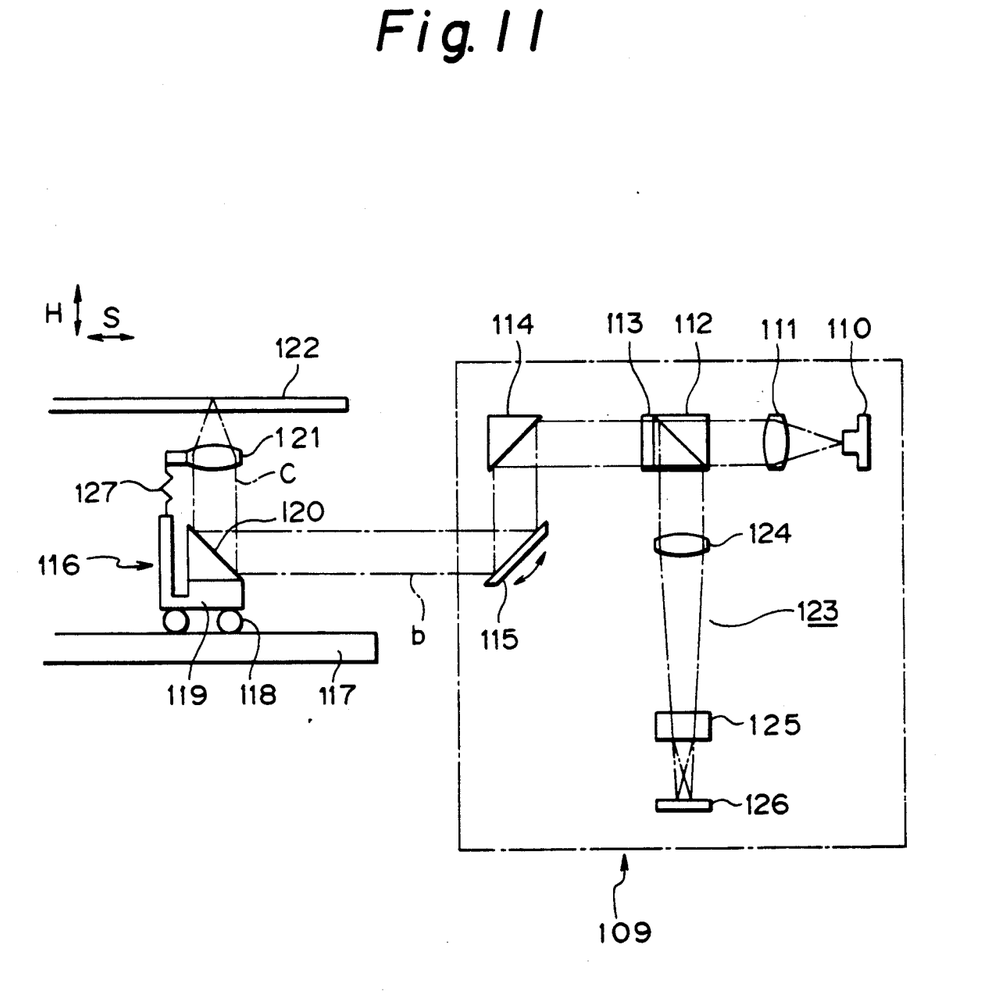
FIG. 11 is a constructional view of still another example of the optical pickup device relating to the present invention.

The proposed disk drive, as illustrated in FIG. 11, comprises a fixed optical system 109 in which a laser beam emitted from a semiconductor laser source 110 is collimated by a coupling lens 111 and passes through a polarization beam splitter 112 and a quarter-wave plate 113. After that a deflection prism 114 deflects the laser beam toward a tracking mirror 115 which reflects the laser beam out of the fixed optical system 109.

The laser beam output from the fixed optical system 109 is introduced into a movable optical system 116. The movable optical system 116 comprises a carriage base 119 which is mounted on a rail 117 through rollers 118. Rail 117 is disposed along the seeking direction S.

A deflection prism 120 is mounted on the carriage base 119. The beam reflected by the prism 120 is converged by an objective lens 121 on a surface of an optical disk 122 to write information on the disk 122 or read information from the disk.

On the other hand, rays reflected from the disk 122 propagate back through the movable system 116 to the fixed system 109. In the fixed system 109, the reflection beam is reflected by the polarization beam splitter 112 toward a signal detection portion 123 which includes a condenser lens 124 for converging the beam, a cylindrical lens 125 for generating astigmatism in the beam and a four-division element 126 which detects a focus error signal and a track error signal as well as reads information from the disk.

When the focal point on the disk is to be adjusted, a focus actuator 127 arranged in the movable system 116 is driven in response to the focus error signal. Whereas when the tracking position is to be adjusted, the tracking mirror 115 arranged in the fixed system 109 is driven in response to the track error signal. Since the tracking servo system including the tracking mirror 115 for adjusting the tracking position is disposed within the fixed system 109, the weight of the movable system 116 is reduced, which makes it possible to shorten the access time of the pickup and delete the mechanical interference which impairs the function of the fixed system 109 and which is generated due to the movement of the movable system 116.

However, in accordance with the above-mentioned separation type pickup device wherein the movable system 116 is separated from the fixed system 109, as illustrated in FIG. 11, the optical path between the deflection prism 114 and the tracking mirror 115 is perpendicular to the disk surface, that is, perpendicular to the optical path between the fixed system 109 and the movable system 116. Therefore, a relatively large space is required in the direction perpendicular to the disk surface, which means the device becomes tall and large.

The above-mentioned drawbacks can be obviated by an embodiment of the optical pickup device in accordance with the present invention.

Figure 7:
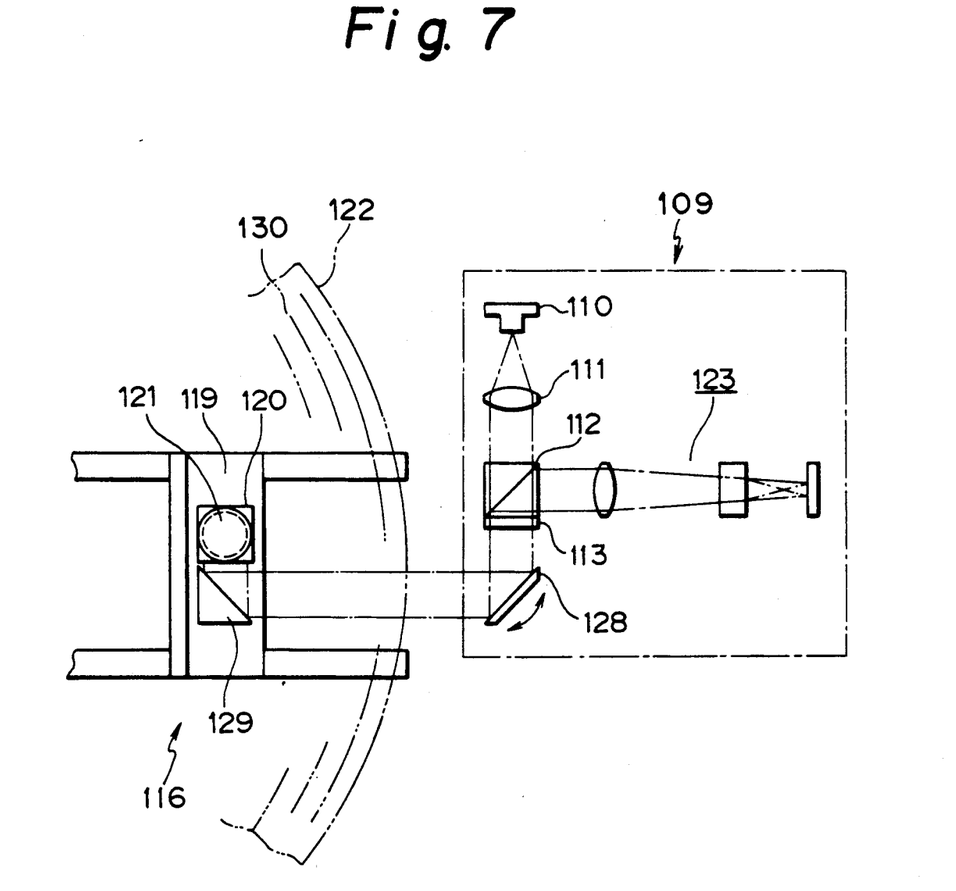
FIG. 7 is a constructional view of another embodiment of the optical pickup device in accordance with the present invention.

The embodiment is described below with reference to FIGS. 7 to 9. The whole structure of the separation type pickup device to which the present invention is applied is substantially the same as the structure of FIG. 11 except for the featured points described below. The corresponding parts are referred to by the same reference numerals as the structure of FIG. 11.

In a fixed optical system 109, a first deflection member composed of a tracking mirror 128 is disposed on an optical path of the beam which is emitted from a semiconductor laser source 110 and passes through a polarization beam splitter 112 so as to be output from the system 109. The mirror 128 is rotatable about an axis which is perpendicular to the surface of the optical disk 122.

Also, in a movable optical system 116, a second deflection member composed of a deflection prism 129 is disposed on an optical path of the beam in the system 116 between a deflection prism 120 and the entrance of the system 116 which beam is output from the system 109 after deflected by the mirror 128 and guided into the system 116. The prism 129 functions to deflect an incident beam by 90 degrees in a plane which is parallel to the surface of te disk 122.

In accordance with the structure mentioned above, a laser beam emitted from a semiconductor laser source 110 passes through a coupling lens 111, a polarization beam splitter 112 and a quarter-wave plate 113 and impinges on tracking mirror 128. The mirror 128 reflects the beam so that the beam is output from the system 109 and propagates into the system 116. In the system 116, the beam is reflected by the prism 129 toward the prism 120 which reflects the beam in the direction perpendicular to the surface of the disk 122. After that, the beam is converged by the objective lens 121 on the disk 122.

The beam is reflected by the disk 122. Some of the reflections rays propagate back through the lens 121 and the prisms 120 and 129 to the system 109. In the system 109, the reflection beam is reflected by the mirror 128 and the splitter 112 and guided toward the signal detection portion 123 which detects a focus error signal and a track error signal as well as the information signal recorded in the disk 122 from the reflection beam.

Figure 8:
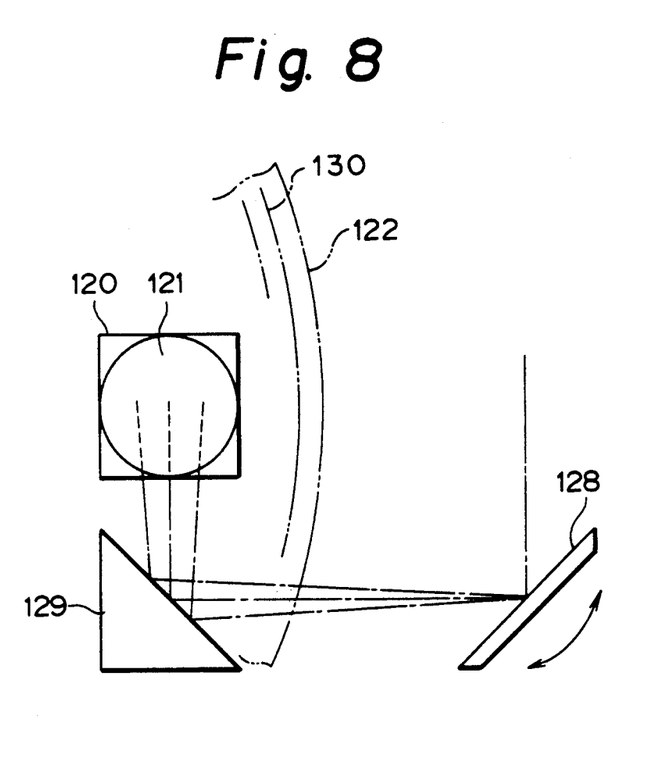
FIG. 8 is an explanatory view of the tracking mirror of FIG. 7 for explaining the function of changing the optical path by the mirror.
Figure 9:
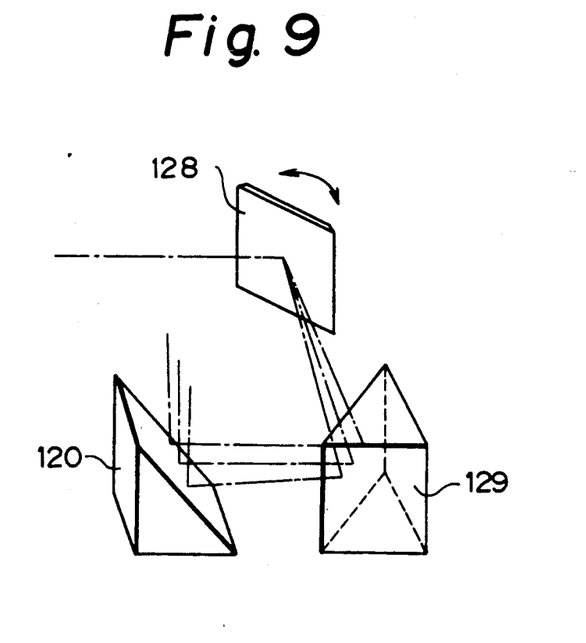
FIG. 9 is an explanatory perspective view of the tracking mirror for the same purpose as FIG. 8.

In the above-mentioned function of the optical pickup device in accordance with the embodiment of the present invention, the mirror 128 is rotated about an axis which is perpendicular to the surface of the disk 122, as illustrated in FIGS. 8 and 9. Therefore, the mirror 128 deflects the incident beam in a plane which is parallel to the surface of the disk 122 on which the tracks 130 are formed. That is, the horizontal direction of the beam is changed without changing the vertical direction thereof.

The deflected beam is turned by 90 degrees by the prism 129. That is, the prism 129 reflects the incident beam to the direction perpendicular to the incident beam. After that, the beam is further reflected by the prism 120 toward the disk 122.

By providing the prism 129, it becomes possible to deflect the beam in the direction which transverses the tracks on the disk 122. Therefore, it becomes possible to perform the tracking servo operation controlling the tracking point by rotating the mirror 128 in response to the track error signal.

Note that the focus servo operation controlling the focal point on the disk can be conducted in a manner similar to that of the device of the related art of FIG. 11 mentioned before utilizing the astigmatism method.

As mentioned above, by the provision of the mirror 128 in the system 109 which mirror 128 is rotatable about an axis perpendicular to the surface of the disk 122, it becomes possible to arrange all of the optical parts constituting the system 109 in the same plane, which makes it possible to reduce the height of the device in the direction perpendicular to the disk surface, thus realizing a thin and compact separation type optical pickup device.

Many widely different embodiment of the present invention may be constructed without departing from the sprit and scope of the present invention. It should be understood that the present invention is not limited to the specific embodiments described in the specification, except as defined in the appended claims.

What is claimed is:

1. A split type optical pick-up device for an optical information recording medium comprising a fixed optical system which is unmovable with respect to said optical information recording medium, and a movable optical system which is movable with respect to said information recording medium; said fixed optical system comprising:

an optical beam emitting means for emitting an optical beam parallel to a surface of said information recording medium;

an optical signal detecting means for receiving an optical beam reflected from said information recording medium, detecting a focusing error signal, a tracking error signal and an information signal on the basis of said received reflected optical beam, and outputting a first signal representing said detected focusing error signal and a second signal representing said detected tracking error signal; and a first deflection means, disposed on an optical axis of said emitted optical beam from said optical beam emitting means, for deflecting said emitted optical beam toward said movable optical system, said first deflection means being adapated to bary a deflection angle of said deflected optical beam in a plane which is parallel to the surface of said information recording medium on the basis of said second signal, thereby performing a tracking operation;

and said movable optical system comprising:

carriage means adapted to be translationally movable in a radial direction of said information recording medium;

a second deflection means, fixedly mounted on said carriage means, for deflecting said deflected optical beam from said first deflection means toward said information recording medium;

an objective lens fixedly mounted on said carriage means for converging said deflected optical beam from said second deflection means on said information recording medium; and a focus actuator disposed on said carriage means and connected to said objective lens for controlling a focusing of said objective lens on the basis of said first signal from said optical signal detecting means.

2. A split type optical pick-up device according to claim 1, in which said first deflection means comprises a first prism arranged such that the prism face thereof receives said emitted optical beam from said optical beam emitting means and which first prism rotates about an axis which is parallel to said optical axis of said emitted optical beam, and said second deflection means comprises a second prism disposed on said carriage means so as to deflect a deflected optical beam from said first prism toward said information recording medium and to deflect said reflected optical beam from said information recording medium toward said first prism.

3. A split type optical pick-up device according to claim 2, in which said first prism is rotated about an axis which coincides with said optical axis of said emitted optical beam.

4. A split type optical pick-up device according to claim 2, in which said first prism is supported by means of leaf springs each of which is secured to a fixed portion of said fixed optical system at one end thereof.

5. A split type optical pick-up device according to claim 1, in which said first deflection means comprises a deflection mirror formed into a shape of flat plate, and arranged such that a mirror face thereof receives said emitted optical beam from said optical beam emitting means, and which rotates about an axis which is parallel to said optical axis of said emitted optical beam, and said second deflection means comprises a deflection prism disposed on said carriage means so as to deflect a deflected optical beam from said deflection mirror toward said information recording medium and to deflect said reflected optical beam from said information recording medium toward said deflection mirror.

6. A split type optical pick-up device according to claim 5, in which said deflection mirror rotates about an axis which coincides with said optical axis of said emitted optical beam.

7. A split type optical pick-up device according to claim 1, in which said first deflection means comprises a tracking mirror arranged in such a manner as to be capable of rotating about an axis which is perpendicular to said surface of said information recording medium so as to deflect said emitted optical beam is said plane which is parallel to the surface of said information recording medium, and said second deflection means comprises a first deflection prism disposed on said carriage means such that an optical beam deflected by said tracking mirror is deflected by an angle of 90° in said plane which is parallel to the surface of said information recording medium, and a second deflection prism disposed on said carriage means such that an optical beam deflected by said first deflection prism is deflected toward said information recording medium.

* * * * *